United States Patent
Snyder et al.

(10) Patent No.: US 10,103,556 B2
(45) Date of Patent: Oct. 16, 2018

(54) LOAD SIDE METHOD OF BLOCKING CHARGER VOLTAGE FROM A BATTERY LOAD

(71) Applicant: MOTOROLA SOLUTIONS, INC., Schaumburg, IL (US)

(72) Inventors: Robert L. Snyder, Suwanee, GA (US); Muhamad Ridzuan Bin Azizan, Kedah (MY); Roger L. Boyer, Snellville, GA (US); Donald L. Flowers, Dacula, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 237 days.

(21) Appl. No.: 14/944,002

(22) Filed: Nov. 17, 2015

(65) Prior Publication Data

US 2017/0141592 A1 May 18, 2017

(51) Int. Cl.
| | |
|---|---|
| *H02J 7/00* | (2006.01) |
| *H02H 3/08* | (2006.01) |
| *H02H 3/20* | (2006.01) |
| *H02H 3/087* | (2006.01) |
| *H02H 7/18* | (2006.01) |

(52) U.S. Cl.
CPC ............. *H02J 7/0031* (2013.01); *H02H 3/08* (2013.01); *H02H 3/087* (2013.01); *H02H 3/20* (2013.01); *H02H 3/202* (2013.01); *H02H 7/18* (2013.01); *H02J 7/0042* (2013.01); *H02J 2007/0037* (2013.01); *H02J 2007/0039* (2013.01)

(58) Field of Classification Search
USPC ............ 361/86–87, 93.7–93.9; 320/134, 136
See application file for complete search history.

(56) References Cited

U.S. PATENT DOCUMENTS

| | | |
|---|---|---|
| 5,569,550 A | 10/1996 | Garrett et al. |
| 5,576,612 A | 11/1996 | Garrett et al. |
| 6,133,711 A | 10/2000 | Hayashi et al. |
| 6,771,051 B2 | 8/2004 | Oglesbee et al. |
| 6,903,533 B1 | 6/2005 | Geren et al. |

(Continued)

FOREIGN PATENT DOCUMENTS

| | | |
|---|---|---|
| EP | 2317597 | 5/2011 |
| EP | 2360806 | 8/2011 |

OTHER PUBLICATIONS

GB1617634.9 Combined Search and Examination Report from the Intellectual Property Office of Great Britain dated Mar. 30, 2017 (4 pages).

*Primary Examiner* — Danny Nguyen
(74) *Attorney, Agent, or Firm* — Michael Best & Friedrich LLP

(57) ABSTRACT

Methods and apparatus for a protection circuit for a battery and a battery connected device during charging are provided. In one embodiment, the apparatus includes a load-blocking switch connected between a rechargeable battery and an electronic device and a charge-blocking switch connected between the rechargeable battery and a charger. The apparatus also includes a safety circuit to detect a voltage across and the current flowing through the rechargeable battery. The safety circuit opens the load-blocking switch and the charge-blocking switch when it detects that the voltage across or the current flowing through the battery exceeds a predetermined threshold.

20 Claims, 3 Drawing Sheets

(56) References Cited

U.S. PATENT DOCUMENTS

| | | | |
|---|---|---|---|
| 7,068,012 B1* | 6/2006 | Geren | H01M 2/348 |
| | | | 320/136 |
| 7,952,330 B2 | 5/2011 | Mori | |
| 8,559,151 B2 | 10/2013 | Huber et al. | |
| 8,654,495 B2* | 2/2014 | Tinglow | H02J 7/0026 |
| | | | 361/91.1 |
| 8,947,052 B2 | 2/2015 | Nishizawa et al. | |
| 9,267,998 B2* | 2/2016 | Gaul | G01R 31/3627 |
| 2005/0127878 A1 | 6/2005 | Geren et al. | |
| 2005/0162131 A1 | 7/2005 | Sennami et al. | |
| 2006/0208850 A1 | 9/2006 | Ikeuchi et al. | |
| 2007/0075684 A1 | 4/2007 | Liu et al. | |
| 2007/0216351 A1 | 9/2007 | Seki | |
| 2008/0048621 A1* | 2/2008 | Yun | H02J 7/0004 |
| | | | 320/136 |
| 2010/0079108 A1* | 4/2010 | Monden | H02J 7/0026 |
| | | | 320/116 |
| 2010/0117602 A1 | 5/2010 | Matsui et al. | |
| 2011/0267726 A1 | 11/2011 | Ikeuchi et al. | |
| 2013/0162217 A1* | 6/2013 | Gaul | H02J 7/00 |
| | | | 320/134 |
| 2013/0308239 A1 | 11/2013 | Yamada et al. | |

* cited by examiner

LOAD SIDE METHOD OF BLOCKING CHARGER VOLTAGE FROM A BATTERY LOAD

BACKGROUND OF THE INVENTION

Electronic devices often include a rechargeable battery that can be charged by connecting the electronic device to a charger. These chargers also provide electrical power to the electronic device while the rechargeable battery is charging. Connecting an electronic device to a faulty charger may result in an excess voltage or current being applied to the electronic device and the rechargeable battery. This excess voltage or current, if not removed, may damage the rechargeable battery, the electronic device, or both.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
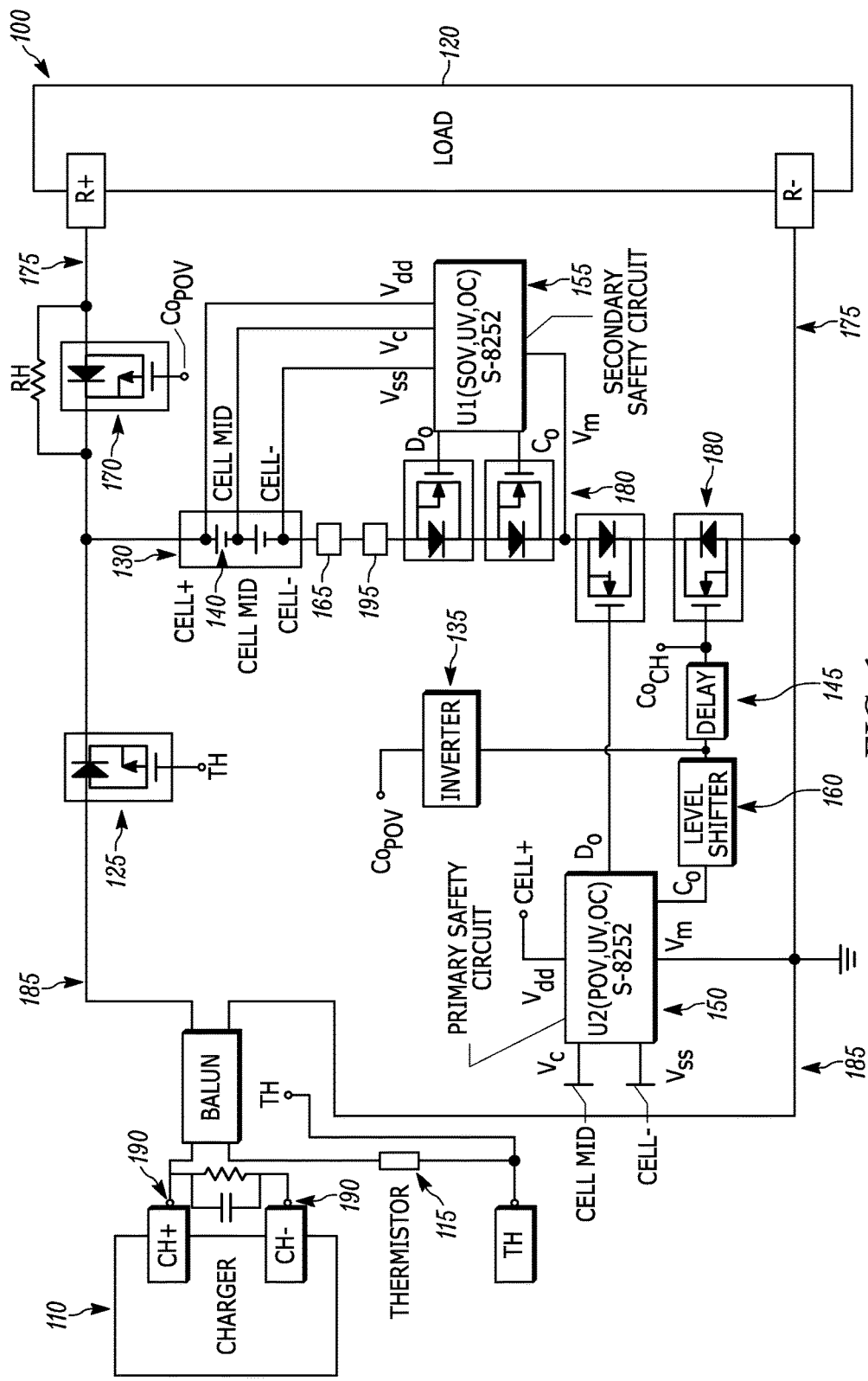
FIG. 1 is a circuit diagram of a positive load side method of blocking charger voltage in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a protection circuit for an electronic device having a rechargeable battery. The protection circuit includes a load path connecting the rechargeable battery to the electronic device and a charge path connecting the rechargeable battery to a charger. A load-blocking switch is electrically connected in the load path and a charge-blocking switch is electrically connected in the charge path. The protection circuit also includes a safety circuit electrically connected to the rechargeable battery, the load-blocking switch, and the charge-blocking switch. The safety circuit monitors an electrical parameter of the rechargeable battery.

Another embodiment provides a method of protecting an electronic device connected to a rechargeable battery. The method includes providing a load path between the rechargeable battery and the electronic device and providing a charge path between the rechargeable battery and a charger. The method also includes connecting a load-blocking switch in the load path and connecting a charge-blocking switch in the charge path. A safety circuit detects an electrical parameter of the rechargeable battery and opens the load-blocking switch and the charge-blocking switch when the electrical parameter exceeds a threshold value.

FIG. 1 is a circuit diagram of one embodiment of a battery protection circuit 100 that can be utilized to implement a positive load side method of blocking charger voltage. In the example illustrated, the battery protection circuit 100 includes a charger 110, a load 120, a rechargeable battery 130, a primary safety circuit 150, a load-blocking switch 170, and a charge-blocking switch 180. The rechargeable battery 130 includes battery cells 140. In the example illustrated, a positive terminal CH+ of the charger 110 is connected to a positive terminal Cell+ of the rechargeable battery 130 and a positive terminal R+ of the load 120. Similarly, a negative terminal CH− of the charger 110 is connected to a negative terminal Cell− of the rechargeable battery 130 and a negative terminal R− of the load 120. The path between the terminals (CH+ and CH−) of the charger 110 and the terminals (Cell+ and Cell−) of the rechargeable battery 130 defines a charge path 185 of the battery protection circuit 100. It should be noted that the charge path 185 is an exemplary path and that a charge path of a different configuration could be utilized in other embodiments. The charger 110 charges the rechargeable battery 130.

In one embodiment, the battery protection circuit 100 is provided in a housing of an electronic device and the charger 110 is external to the housing of the electronic device. The positive terminal CH+ and the negative terminal CH− of the charger 110 are electrically connected to the battery protection circuit 100 through the contacts 190 when the charger is plugged into the electronic device. In other embodiments, the charger 110 may be located in the housing of the electronic device. In yet other embodiments, the rechargeable battery 130 and the battery protection circuit 100 are located outside the housing of the electronic device (e.g., in a separate housing).

The rechargeable battery 130 provides electrical power for operation of the load 120. For example, the load 120 can be other circuit components (e.g., microprocessor, memories, amplifiers, communication circuits and the like) of the electronic device which may be a radio or a mobile telephone. The positive terminal Cell+ of the rechargeable battery 130 is connected to the positive terminal R+ of the load 120 and the negative terminal Cell− of the rechargeable battery 130 is connected to the negative terminal R− of the load 120. The path between the terminals (Cell+ and Cell−) of the rechargeable battery 130 and the terminals (R+ and R−) of the load 120 defines a load path 175 of the battery protection circuit 100. As was noted with respect to the charge path 185, the load path 175 is an exemplary path. The load path 175 could be configured in a different manner than the manner shown. In certain embodiments, the load 120 also receives electrical power from the charger 110 when the rechargeable battery 130 is charging.

The primary safety circuit 150 monitors electrical parameters of the rechargeable battery 130. For example, the primary safety circuit 150 monitors, among other things, a voltage across the rechargeable battery 130 and a current flowing through the rechargeable battery 130. In the example illustrated, the primary safety circuit 150 is connected to the positive terminal Cell+, the negative terminal Cell−, and a middle terminal Cell Mid of the rechargeable battery 130. In the example illustrated, an over-current (OC) scaling resistor 165 and a sense resistor 195 are connected in series with the rechargeable battery 130. The primary safety circuit 150 utilizes the over-current scaling resistor 165 and the sense resistor 195 to monitor the current and voltage conditions of the rechargeable battery 130. In certain embodiments, the battery protection circuit 100 is provided with a secondary safety circuit 155. The secondary safety circuit 155 is a redundant circuit that performs the same functions as the primary safety circuit 150 when the primary safety circuit 150 fails.

In operation, when the primary safety circuit 150 detects that the rechargeable battery 130 is in an over-current or an over-voltage condition, the primary safety circuit 150 drives a control signal Co to control the load-blocking switch 170 and the charge-blocking switch 180. An over-current condition occurs when the current provided by the charger 110 exceeds a predetermined threshold. An over-voltage condition occurs when the voltage across the rechargeable battery 130 exceeds a predetermined threshold. The control signal Co may take one of two logic states: a HIGH state and a LOW state. During normal operation (i.e., when no over-voltage or over-current is detected), the control signal is HIGH. The primary safety circuit 150 drives the control signal Co LOW upon detecting an over-current, an over-voltage, or an over-charged condition. The primary safety circuit 150 and the secondary safety circuit 155 may be implemented, for example, using available integrated circuits, such as, the S-8252 integrated circuit available from Seiko Instruments Inc.

In certain embodiments, the control signal Co is input to a level shifter 160. The level shifter 160 converts digital signals from one logic standard to another and outputs a level shifted control signal $CO_{LS}$. For example, in certain embodiments where the load-blocking switch 170 and the charge-blocking switch 180 are implemented by metal-oxide-semiconductor field effect transistors (MOSFETs), the level shifter 160 converts the control signal Co to a complementary metal-oxide-semiconductor (CMOS) logic signal $Co_{LS}$. In other embodiments, the level shifter 160 converts the control signal Co to logic signal $Co_{LS}$ that is compatible with other switch technologies (e.g., emitter-coupled logic, transistor-transistor logic etc., etc.).

In the example illustrated, a delay circuit 145 is electrically connected between the level shifter 160 and the charge-blocking switch 180. Disconnecting the rechargeable battery 130 from the charger 110 prior to disconnecting the load 120 from the charger 110 may cause voltage spikes to be applied to the load 120. Introducing a delay between opening the load-blocking switch 170 and opening the charge-blocking switch 180 (or delaying opening of the charge-blocking switch 180) helps prevent the voltage spikes from being applied to the load 120. The delay circuit 145 provides this delay between the control signals for opening the load-blocking switch 170 and the charge-blocking switch 180. The delay circuit 145 introduces a delay in the level shifted control signal $Co_{LS}$ and outputs a charge-blocking control signal $Co_{CH}$.

In the example illustrated, an inverter circuit 135 is electrically connected between the level shifter 160 and the load-blocking switch 170. The inverter circuit 135 inverts the level shifted control signal $Co_{LS}$ and outputs a load-blocking control signal $Co_{POV}$. The load-blocking control signal $Co_{POV}$ is provided to the load-blocking switch 170 and the charge-blocking control signal $Co_{CH}$ is provided to the charge-blocking switch 180. The control signals ($Co_{POV}$ and $Co_{CH}$) may take one of two logic states: a HIGH state and a LOW state, similar to the control signal Co. When the control signal $Co_{POV}$ is in the LOW state, and $Co_{CH}$ is in the HIGH state, the load-blocking switch 170 and the charge-blocking switch 180 are closed. When the control signal $Co_{POV}$ is in the HIGH state and $Co_{CH}$ is in the LOW state, the load-blocking switch 170 and the charge-blocking switch 180 are open. In other embodiments, a different combination of the above elements may be connected between the primary safety circuit 150, the load-blocking switch 170 and the charge-blocking switch 180. Further, different logic states may be used to open and close the load-blocking switch 170 and the charge-blocking switch 180.

In the example illustrated, the load-blocking switch 170 is electrically connected in the load path 175 of the battery protection circuit 100 between a positive terminal Cell+ of the rechargeable battery 130 and a positive terminal R+ of the load 120. In certain embodiments, a P channel field effect transistor (FET) may be used as the load-blocking switch 170. The body diode anode of the P channel field effect transistor is connected to the positive terminal R+ of the load 120. The load-blocking switch 170 is controlled by the primary safety circuit 150 using the control signal Co. The control signal Co is passed through the level shifter 160 and the inverter circuit 135 to drive the load-blocking switch 170 using the load-blocking control signal $Co_{POV}$. The load-blocking control signal $Co_{POV}$ opens and closes the load-blocking switch 170. When the primary safety circuit 150 detects an over-current or an over-voltage condition, the primary safety circuit 150 sets the control signal Co to the LOW state, the level shifter 160 drives the level shifted control signal $CO_{LS}$ to a complementary metal-oxide-semiconductor logic LOW state, and the inverter circuit 135 drives the load-blocking control signal $Co_{POV}$ to a HIGH state. The load-blocking control signal $Co_{POV}$ opens the load-blocking switch 170 when in the HIGH state. When the load-blocking switch 170 is open, the load 120 is disconnected from the charger, i.e., the positive terminal R+ of the load 120 is electrically disconnected from the positive terminal CH+ of the charger 110 and the positive terminal Cell+ of the rechargeable battery 130.

In the example illustrated, the charge-blocking switch 180 is electrically connected in the charge path 185 of the battery protection circuit 100 between the negative terminal CH− of the charger 110 and a negative terminal Cell− of the rechargeable battery 130. In other embodiments, the charge-blocking switch 180 may be electrically connected between the positive terminal CH+ of the charger 110 and the positive terminal Cell+ of the rechargeable battery 130. The charge-blocking switch 180 is controlled by the primary safety circuit 150 using the control signal Co. The control signal Co is passed through the level shifter 160 and the delay circuit 145 to output a delayed charge-blocking control signal $Co_{CH}$. The charge-blocking control signal $Co_{CH}$ opens and closes the charge-blocking switch 180. When the primary safety circuit 150 detects an over-current or an over-voltage condition, the primary safety circuit 150 sets the control signal Co to the LOW state, the level shifter 160 drives the level shifted control signal $CO_{LS}$ to a complementary metal-oxide-semiconductor logic LOW state. The delay circuit 145 drives the charge-blocking control signal $Co_{CH}$ LOW a predetermined amount of time (for example, one clock cycle) after the level shifted control signal $Co_{LS}$ is set to LOW. The charge-blocking control signal $Co_{CH}$ opens the charge-blocking switch 180 when in the LOW state. When the charge-blocking switch 180 is open, the rechargeable battery 130 is disconnected from the charger 110.

In certain embodiments, a high resistance resistor RH is connected across the load-blocking switch 170 to provide a discharge path for an overcharged rechargeable battery 130. When the rechargeable battery 130 is in an overcharged state, the rechargeable battery 130 may discharge with high voltage and currents to the load 120, thereby damaging the load 120. When the primary safety circuit 150 detects that the rechargeable battery 130 is overcharged, the primary safety circuit 150 opens the load-blocking switch 170. The high resistance resistor RH connected across the load-blocking switch 170 discharges the rechargeable battery 130 when the load-blocking switch 170 is open to return the rechargeable battery 130 to a normal state.

In other embodiments, the battery protection circuit 100 may also include a thermistor 115 to monitor a temperature of the rechargeable battery 130 and the load 120. When the temperature exceeds a predetermined threshold, the thermistor 115 opens a discharge-blocking switch 125 electrically connected between the charger 110 and the rechargeable battery 130. The thermistor 115 drives (i.e., opens and closes) the discharge-blocking switch 125 with the control signal TH.

Figure 2:
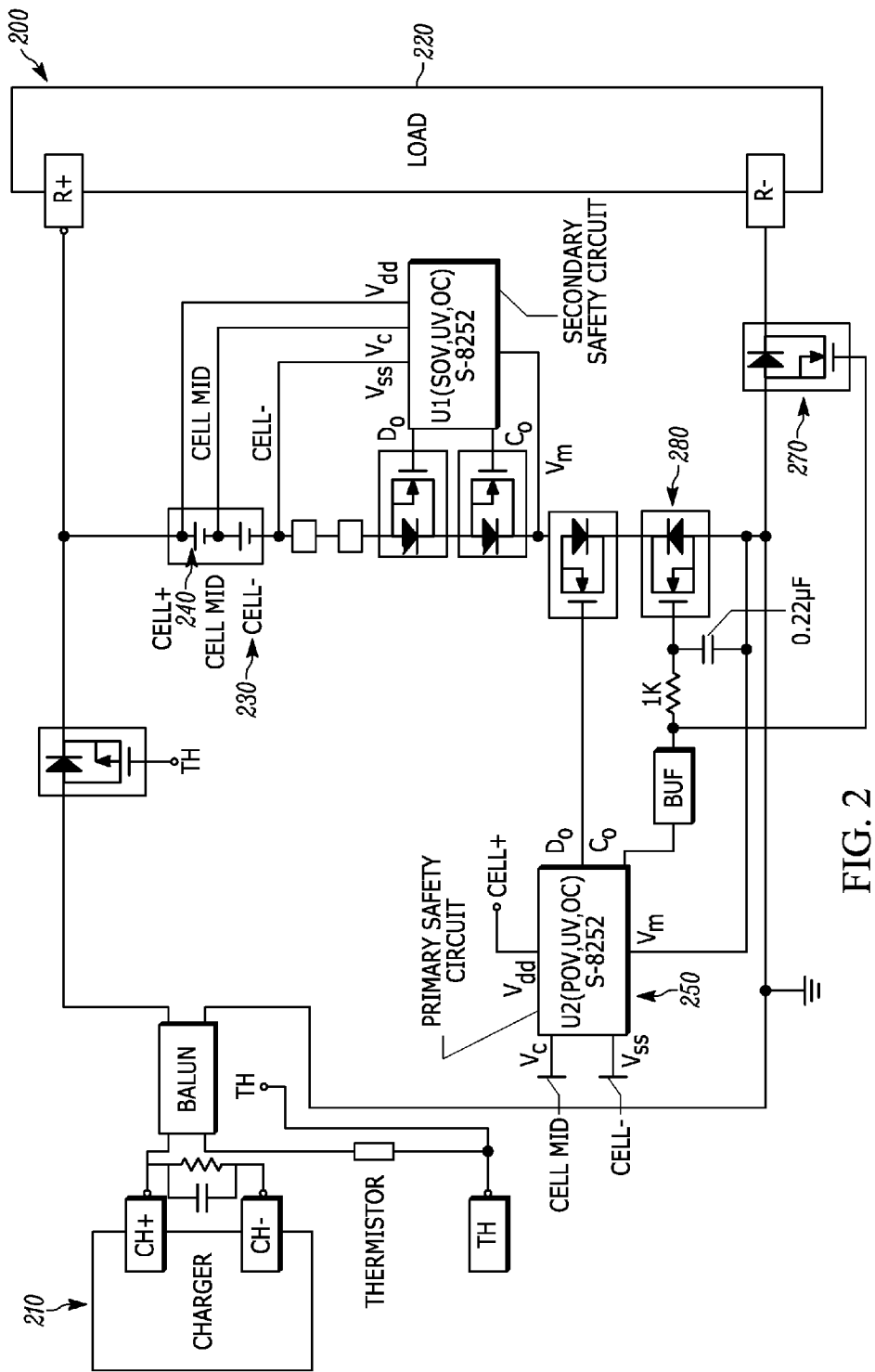
FIG. 2 is a circuit diagram of a negative load side method of blocking charger voltage in accordance with some embodiments.

FIG. 2 is a circuit diagram of a battery protection circuit 200 illustrating a negative load side method of blocking charger voltage. In the example illustrated, the battery protection circuit 200 is similar to the battery protection circuit 100 of FIG. 1 but with the load-blocking switch 270 electrically connected between the negative terminal Cell− of the rechargeable battery 230 and the negative terminal R− of the load 220. In certain embodiments, an N channel field effect transistor (FET) may be used as the load-blocking switch 270.

Figure 3:
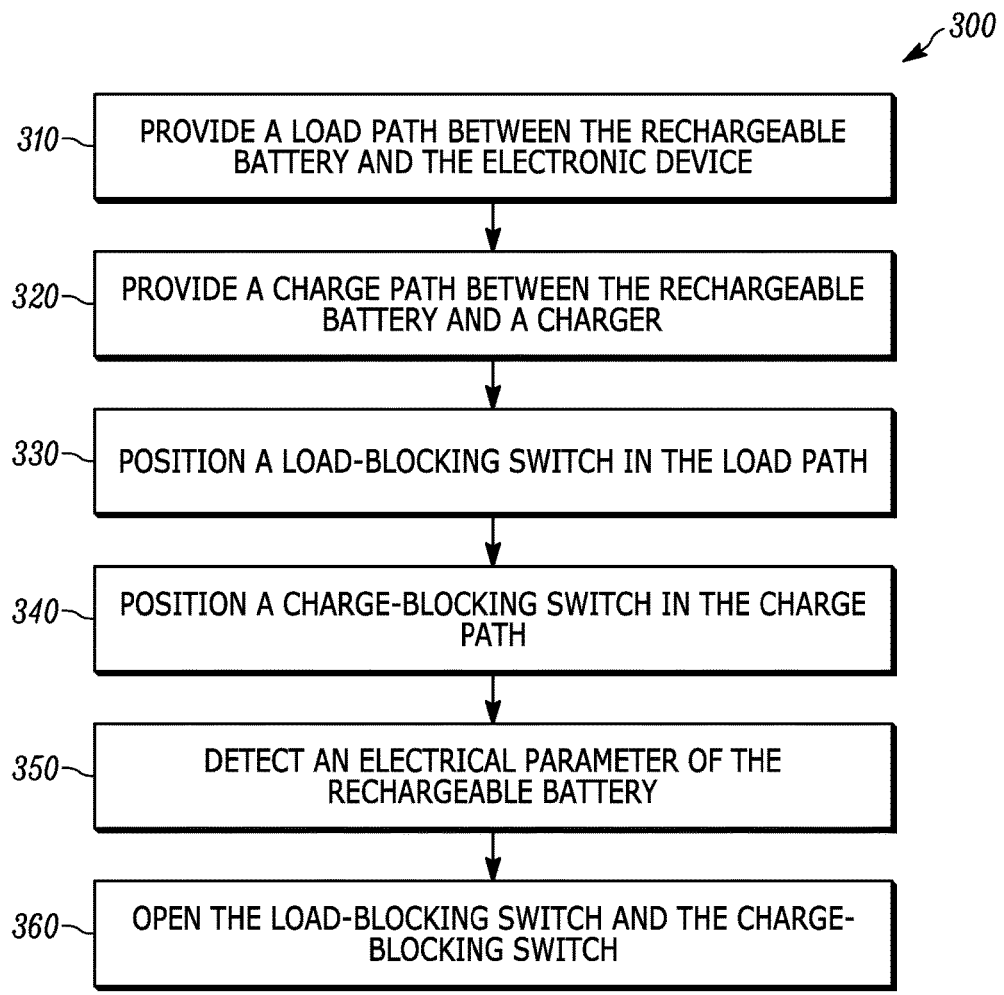
FIG. 3 is a flowchart of a method of protecting a load connected to a rechargeable battery in accordance with some embodiments.

FIG. 3 is a flowchart of an exemplary method 300 of protecting a load 120 connected to a rechargeable battery 130. Although the method blocks are described in conjunction with systems and devices of FIGS. 1 and 2, the method 300 could be utilized with other systems or devices. In addition, the method 300 may be modified or performed differently than the specific example provided.

The method 300 is performed by the electronic device (i.e., the battery protection circuit 100, the primary safety circuit 150, or a combination thereof). It should be understood that the functionality provided in the method 300 can be distributed between the primary safety circuit 150 and the electronic device in various configurations.

The method 300 includes providing a load path 175 between the rechargeable battery 130 and the load 120 (at block 310). In block 320, a charge path 185 is provided between the rechargeable battery 130 and a charger 110. In block 330, a load-blocking switch 170 is electrically connected in the load path 175. In block 340, a charge-blocking switch 180 is electrically connected in the charge path 185.

In block 350, the primary safety circuit 150 detects an electrical parameter of the rechargeable battery 130. For example, the primary safety circuit 150 may detect a voltage across the rechargeable battery 130 and/or a current flowing through the rechargeable battery 130. In block 360, the primary safety circuit 150 opens the load-blocking switch 170 and the charge-blocking switch 180 when the electrical parameter exceeds a threshold value.

One advantage of the technique disclosed is that by moving the blocking switch to the load path, the charger voltage is not removed from the safety circuit when the blocking switch opens. This allows the safety circuit to maintain over charge state keeping the blocking switches open until the over voltage or over current charger is removed.

Another advantage of the technique disclosed is that the battery protection circuit does not require a charge fuse. Further, the blocking switch impedance is removed from the charging path, thereby, reducing heat and resulting in faster charging of the battery.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A protection circuit for an electronic device having a rechargeable battery, the protection circuit comprising:
    a load path between a first node and a second node and including a load of the electronic device;
    a cell path between the first node and the second node and including a battery cell of the rechargeable battery, wherein the cell path is parallel to the load path;
    a load-blocking switch electrically connected in the load path;
    a charge-blocking switch electrically connected in the cell path;
    a safety circuit electrically connected to the rechargeable battery, the load-blocking switch, and the charge-blocking switch, wherein the safety circuit monitors an electrical parameter of the rechargeable battery, wherein the safety circuit further opens the load-blocking switch and opens the charge-blocking switch upon detecting that the electrical parameter exceeds a predetermined threshold; and
    a level shifter electrically connected between the safety circuit, the load-blocking switch and the charge-blocking switch.

2. The protection circuit of claim 1, wherein the electrical parameter is a voltage across the rechargeable battery.

3. The protection circuit of claim 1, wherein the electrical parameter is a current flowing through the rechargeable battery.

4. The protection circuit of claim 1, wherein the load-blocking switch is electrically connected between a positive terminal of the rechargeable battery and a positive terminal of the electronic device.

5. The protection circuit of claim 1, wherein the load-blocking switch is electrically connected between a negative terminal of the rechargeable battery and a negative terminal of the electronic device.

6. The protection circuit of claim 1, further comprising a resistor electrically connected across the load-blocking switch, wherein when the rechargeable battery is in an over-charged condition a discharge path is provided from the rechargeable battery through the resistor.

7. The protection circuit of claim 4, wherein the load-blocking switch includes a P channel field effect transistor.

8. The protection circuit of claim 5, wherein the load-blocking switch includes a N channel field effect transistor.

9. The protection circuit of claim 1, further comprising a delay circuit electrically connected between the level shifter and the charge-blocking switch for providing a delay between opening the load-blocking switch and opening the charge-blocking switch.

10. The protection circuit of claim 1, further comprising an inverter circuit electrically connected between the level shifter and the load-blocking switch.

11. The protection circuit of claim 1, further comprising:
    a discharge-blocking switch electrically connected between the charger and the rechargeable battery;
    a thermistor connected to the rechargeable battery and the discharge-blocking switch for monitoring a temperature of the rechargeable battery, wherein the thermistor opens the discharge-blocking switch when the temperature of the rechargeable battery exceeds a predetermined threshold.

12. A method of protecting an electronic device connected to a rechargeable battery, the method comprising:
    providing a load path between a first node and a second node, the load path including a load of the electronic device;
    providing a cell path between the first node and the second node, the cell path including a battery cell of the rechargeable battery and being parallel to the load path;
    electrically connecting a load-blocking switch in the load path;
    electrically connecting a charge-blocking switch in the cell path;
    detecting, with a safety circuit, an electrical parameter of the rechargeable battery;
    opening the load-blocking switch and the charge-blocking switch when the electrical parameter exceeds a threshold value; and
    providing a discharge-blocking switch between the charger and the rechargeable battery;
    monitoring, with a thermistor, a temperature of the rechargeable battery; and
    opening the discharge-blocking switch when the temperature exceeds a predetermined threshold.

13. The method of claim 12, wherein the electrical parameter is a voltage across the rechargeable battery.

14. The method of claim 12, wherein the electrical parameter is a current flowing through the rechargeable battery.

15. The method of claim 12, further comprising delaying opening the charge-blocking switch by a predetermined amount of time after opening the load-blocking switch.

16. The method of claim 12, further comprising electrically connecting a level shifter between the safety circuit, the load-blocking switch and the charge-blocking switch.

17. The method of claim 12, further comprising:
    detecting that the rechargeable battery is in an over-charged condition; and providing a discharge path to the rechargeable battery through a resistor electrically connected across the load-blocking switch.

18. A protection circuit for an electronic device having a rechargeable battery, the protection circuit comprising:
   a load path between a first node and a second node and including a load of the electronic device;
   a cell path between the first node and the second node and including a battery cell of the rechargeable battery, wherein the cell path is parallel to the load path;
   a load-blocking switch electrically connected in the load path;
   a charge-blocking switch electrically connected in the cell path;
   a safety circuit electrically connected to the rechargeable battery, the load-blocking switch, and the charge-blocking switch, wherein the safety circuit monitors an electrical parameter of the rechargeable battery, wherein the safety circuit further opens the load-blocking switch and opens the charge-blocking switch upon detecting that the electrical parameter exceeds a predetermined threshold;
   a discharge-blocking switch electrically connected between the charger and the rechargeable battery; and
   a thermistor connected to the rechargeable battery and the discharge-blocking switch for monitoring a temperature of the rechargeable battery, wherein the thermistor opens the discharge-blocking switch when the temperature of the rechargeable battery exceeds a predetermined threshold.

19. A method of protecting an electronic device connected to a rechargeable battery, the method comprising:
   providing a load path between a first node and a second node, the load path including a load of the electronic device;
   providing a cell path between the first node and the second node, the cell path including a battery cell of the rechargeable battery and being parallel to the load path;
   electrically connecting a load-blocking switch in the load path;
   electrically connecting a charge-blocking switch in the cell path;
   detecting, with a safety circuit, an electrical parameter of the rechargeable battery;
   opening the load-blocking switch and the charge-blocking switch when the electrical parameter exceeds a threshold value; and
   delaying opening the charge-blocking switch by a predetermined amount of time after opening the load-blocking switch.

20. A method of protecting an electronic device connected to a rechargeable battery, the method comprising:
   providing a load path between a first node and a second node, the load path including a load of the electronic device;
   providing a cell path between the first node and the second node, the cell path including a battery cell of the rechargeable battery and being parallel to the load path;
   electrically connecting a load-blocking switch in the load path;
   electrically connecting a charge-blocking switch in the cell path;
   detecting, with a safety circuit, an electrical parameter of the rechargeable battery;
   opening the load-blocking switch and the charge-blocking switch when the electrical parameter exceeds a threshold value; and
   electrically connecting a level shifter between the safety circuit, the load-blocking switch and the charge-blocking switch.

* * * * *